(12) United States Patent
Zhou et al.

(10) Patent No.: US 9,244,758 B2
(45) Date of Patent: Jan. 26, 2016

(54) SYSTEMS AND METHODS FOR REPAIRING SYSTEM FILES WITH REMOTELY DETERMINED REPAIR STRATEGY

(71) Applicant: Tencent Technology (Shenzhen) Company Limited, Shenzhen (CN)

(72) Inventors: Rui Zhou, Shenzhen (CN); Shuai Rao, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 110 days.

(21) Appl. No.: 14/104,209

(22) Filed: Dec. 12, 2013

(65) Prior Publication Data

US 2014/0101482 A1    Apr. 10, 2014

Related U.S. Application Data

(63) Continuation of application No. PCT/CN2013/081004, filed on Aug. 7, 2013.

(30) Foreign Application Priority Data

Sep. 17, 2012    (CN) .......................... 2012 1 0344305

(51) Int. Cl.
  *G06F 11/07*    (2006.01)
  *G06F 9/445*    (2006.01)
  *G06F 21/56*    (2013.01)

(52) U.S. Cl.
  CPC .............. *G06F 11/0793* (2013.01); *G06F 8/67* (2013.01); *G06F 21/565* (2013.01); *G06F 21/568* (2013.01)

(58) Field of Classification Search
  CPC ............... G06F 8/65; G06F 8/67; G06F 8/68; G06F 8/70; G06F 8/71; G06F 8/72; G06F 11/0793; G06F 21/56; G06F 21/565; G06F 21/566; G06F 21/568
  See application file for complete search history.

(56) References Cited

U.S. PATENT DOCUMENTS 6,567,826 B1 *  5/2003  Fischer .............. G06F 11/0706
7,328,456 B1 *  2/2008  Szor et al. ....................... 726/26
(Continued)

FOREIGN PATENT DOCUMENTS

CN    101060427 A    10/2007
CN    101222363 A    7/2008
(Continued)

OTHER PUBLICATIONS

Patent Cooperation Treaty, The International Search Report and The Written Opinion of the International Searching Authority, mailed Nov. 21, 2013, in PCT/CN2013/081004.
(Continued)

*Primary Examiner* — Joseph Schell
(74) *Attorney, Agent, or Firm* — Jones Day

(57) ABSTRACT

Systems and methods are provided for repairing system files. For example, a list of system files including file information of one or more first repairable system files are updated in real time; file information of a target file sent from a terminal is received; whether the target file is in need of repair is detected based on at least information associated with the list of system files; in response to the target file being in need of repair, a first repair strategy for the target file is determined based on at least information associated with a predetermined database of repair strategies and a file type of the target file; and the target file is repaired based on at least information associated with the first repair strategy.

9 Claims, 7 Drawing Sheets

(56) References Cited

U.S. PATENT DOCUMENTS

| | | |
|---|---|---|
| 8,261,246 B1* | 9/2012 | Naroff et al. ................... 717/140 |
| 2006/0010435 A1* | 1/2006 | Jhanwar et al. ............... 717/168 |
| 2006/0174344 A1* | 8/2006 | Costea et al. ................... 726/24 |
| 2007/0016952 A1* | 1/2007 | Stevens ........................... 726/24 |
| 2007/0050361 A1* | 3/2007 | Al-Masri .......................... 707/7 |
| 2007/0073689 A1* | 3/2007 | Chandra .......................... 707/6 |
| 2008/0162915 A1* | 7/2008 | Price ....................... G06F 21/57 713/2 |
| 2010/0037216 A1* | 2/2010 | Carcerano et al. ............ 717/173 |
| 2011/0302567 A1* | 12/2011 | Kobylak et al. ............... 717/168 |
| 2014/0373147 A1* | 12/2014 | Seinfeld et al. ................. 726/23 |
| 2015/0205979 A1* | 7/2015 | Dong .................... G06F 21/568 726/22 |

FOREIGN PATENT DOCUMENTS

| | | |
|---|---|---|
| CN | 102023881 A | 4/2011 |
| TW | 472188 B | 1/2002 |

OTHER PUBLICATIONS

Taiwan Patent Office, Office Action issued Dec. 30, 2014, in Application No. 102130949.

Patent Cooperation Treaty, International Preliminary Report on Patentability, PCT/CN2013/081004, Mar. 17, 2015.

\* cited by examiner

SYSTEMS AND METHODS FOR REPAIRING SYSTEM FILES WITH REMOTELY DETERMINED REPAIR STRATEGY

CROSS-REFERENCES TO RELATED APPLICATIONS

This application is a continuation of International Application No. PCT/CN2013/081004, with an international filing date of Aug. 7, 2013, now pending, which claims priority to Chinese Patent Application No. 201210344305.5, filed Sep. 17, 2012, both applications being incorporated by reference herein for all purposes.

BACKGROUND OF THE INVENTION

The present invention is directed to computer technology. More particularly, the invention provides systems and methods for data processing. Merely by way of example, the invention has been applied to computer software. But it would be recognized that the invention has a much broader range of applicability.

Computers have gradually become an indispensable tool in people's daily life and work. An operating system is a program for managing computer hardware and software resources and also is a kernel and a cornerstone of a computer system. The operating system plays an important role in the interactions between a user and a computer. System files are often stored in one or more system folders of the operating system. Generally, during an installation process of the operating system, multiple system folders may be automatically created and different system files are placed into the corresponding system folders. The system files may directly affect the normal operations of the operating system. Most system files are not allowed to be altered without authorization. The integrity and safety of system files are important for maintaining the stability of a computer system.

It is sometimes inevitable that errors will occur in the system files during the operations of a computer. For example, improper user operations, intrusion of Trojan viruses, or attacks by a hacker may result in the errors in the system files. Currently, the system files that contain errors may be repaired to maintain the integrity of the system files. Specifically, the computer acquires a list of repairable system files from a server and stores the list locally. The computer then scans the local system files according to the list. If certain local system files that are included in the list of repairable system files are determined to contain errors, some files corresponding to the local system files that contain errors are downloaded from the server to replace such local system files. The operating system is rebooted after the file replacement to complete the repair of the system files.

However, there are certain problems related to the conventional technology for repairing system files. For example, the computer is often required to acquire the list of system files from the server and store it locally. The update and maintenance of the locally stored list of system files are often complex and cumbersome. In addition, the operating system is often required to be rebooted after the file replacement, which may result in interruption of certain operations of the computer.

Hence it is highly desirable to improve the techniques for repairing system files.

BRIEF SUMMARY OF THE INVENTION

The present invention is directed to computer technology. More particularly, the invention provides systems and methods for data processing. Merely by way of example, the invention has been applied to computer software. But it would be recognized that the invention has a much broader range of applicability.

According to one embodiment, a method is provided for repairing system files. For example, a list of system files including file information of one or more first repairable system files are updated in real time; file information of a target file sent from a terminal is received; whether the target file is in need of repair is detected based on at least information associated with the list of system files; in response to the target file being in need of repair, a first repair strategy for the target file is determined based on at least information associated with a predetermined database of repair strategies and a file type of the target file; and the target file is repaired based on at least information associated with the first repair strategy.

According to another embodiment, a method is provided for repairing system files. For example, one or more local files are scanned to determine a target file; file information of the target file is uploaded to a query server to determine whether the target file is in need of repair; in response to the target file being in need of repair, a download address and a repair strategy are acquired from the query server; a normal system file corresponding to the target file is downloaded from the download address to replace the target file; and after the target file is replaced, one or more processes or one or more applications related to the target file are restarted based on at least information associated with the repair strategy.

According to yet another embodiment, a query server includes a storage unit, a detection unit, and a processing unit. The storage unit is configured to store a list of system files being updated in real time, the list of system files including file information of one or more first repairable system files. The detection unit is configured to receive file information of a target file sent from a terminal and detect whether the target file is in need of repair based on at least information associated with the list of system files. The processing unit is configured to determine a first repair strategy for the target file based on at least information associated with a predetermined database of repair strategies and a file type of the target file in response to the target file being in need of repair and repair the target file based on at least information associated with the first repair strategy.

In one embodiment, a terminal includes a sending unit and a repair unit. The sending unit is configured to scan one or more local files to determine a target file and upload file information of the target file to a query server to determine whether the target file is in need of repair. The repair unit is configured to, in response to the target file being in need of repair, acquire a download address and a repair strategy from the query server, download a normal system file corresponding to the target file from the download address to replace the target file, and restart, after the target file is replaced, one or more processes or one or more applications related to the target file based on at least information associated with the repair strategy.

In another embodiment, a non-transitory computer readable storage medium includes programming instructions for repairing system files. The programming instructions are configured to cause one or more data processors to execute certain operations. For example, a list of system files including file information of one or more repairable system files are updated in real time; file information of a target file sent from a terminal is received; whether the target file is in need of repair is detected based on at least information associated with the list of system files; in response to the target file being in need of repair, a repair strategy for the target file is determined based on at least information associated with a predetermined database of repair strategies and a file type of the target file; and the target file is repaired based on at least information associated with the repair strategy.

In yet another embodiment, a computer-implemented system for repairing system files includes one or more data processors and a computer-readable storage medium. The computer-readable storage medium is encoded with instructions for commanding the data processors to execute certain operations. For example, a list of system files including file information of one or more repairable system files are updated in real time; file information of a target file sent from a terminal is received; whether the target file is in need of repair is detected based on at least information associated with the list of system files; in response to the target file being in need of repair, a repair strategy for the target file is determined based on at least information associated with a predetermined database of repair strategies and a file type of the target file; and the target file is repaired based on at least information associated with the repair strategy.

According to one embodiment, a non-transitory computer readable storage medium includes programming instructions for repairing system files. The programming instructions are configured to cause one or more data processors to execute certain operations. For example, one or more local files are scanned to determine a target file; file information of the target file is uploaded to a query server to determine whether the target file is in need of repair; in response to the target file being in need of repair, a download address and a repair strategy are acquired from the query server; a normal system file corresponding to the target file is downloaded from the download address to replace the target file; and after the target file is replaced, one or more processes or one or more applications related to the target file are restarted based on at least information associated with the repair strategy.

According to another embodiment, a computer-implemented system for repairing system files includes one or more data processors and a computer-readable storage medium. The computer-readable storage medium is encoded with instructions for commanding the data processors to execute certain operations. For example, one or more local files are scanned to determine a target file; file information of the target file is uploaded to a query server to determine whether the target file is in need of repair; in response to the target file being in need of repair, a download address and a repair strategy are acquired from the query server; a normal system file corresponding to the target file is downloaded from the download address to replace the target file; and after the target file is replaced, one or more processes or one or more applications related to the target file are restarted based on at least information associated with the repair strategy.

For example, the systems and methods described herein are configured for storing a list of system files in a query server to eliminate the need for updating and maintenance of the list of system files by a terminal, reduce the workload of the terminal and make the list of system files available to all terminals. In another example, the systems and methods described herein are configured to restart processes or applications related to a target file after the target file is repaired to ensure that operations of a terminal are not interrupted during the repair process of the target file.

Depending upon embodiment, one or more benefits may be achieved. These benefits and various additional objects, features and advantages of the present invention can be fully appreciated with reference to the detailed description and accompanying drawings that follow.

DETAILED DESCRIPTION OF THE INVENTION

The present invention is directed to computer technology. More particularly, the invention provides systems and methods for data processing. Merely by way of example, the invention has been applied to computer software. But it would be recognized that the invention has a much broader range of applicability.

Figure 1:
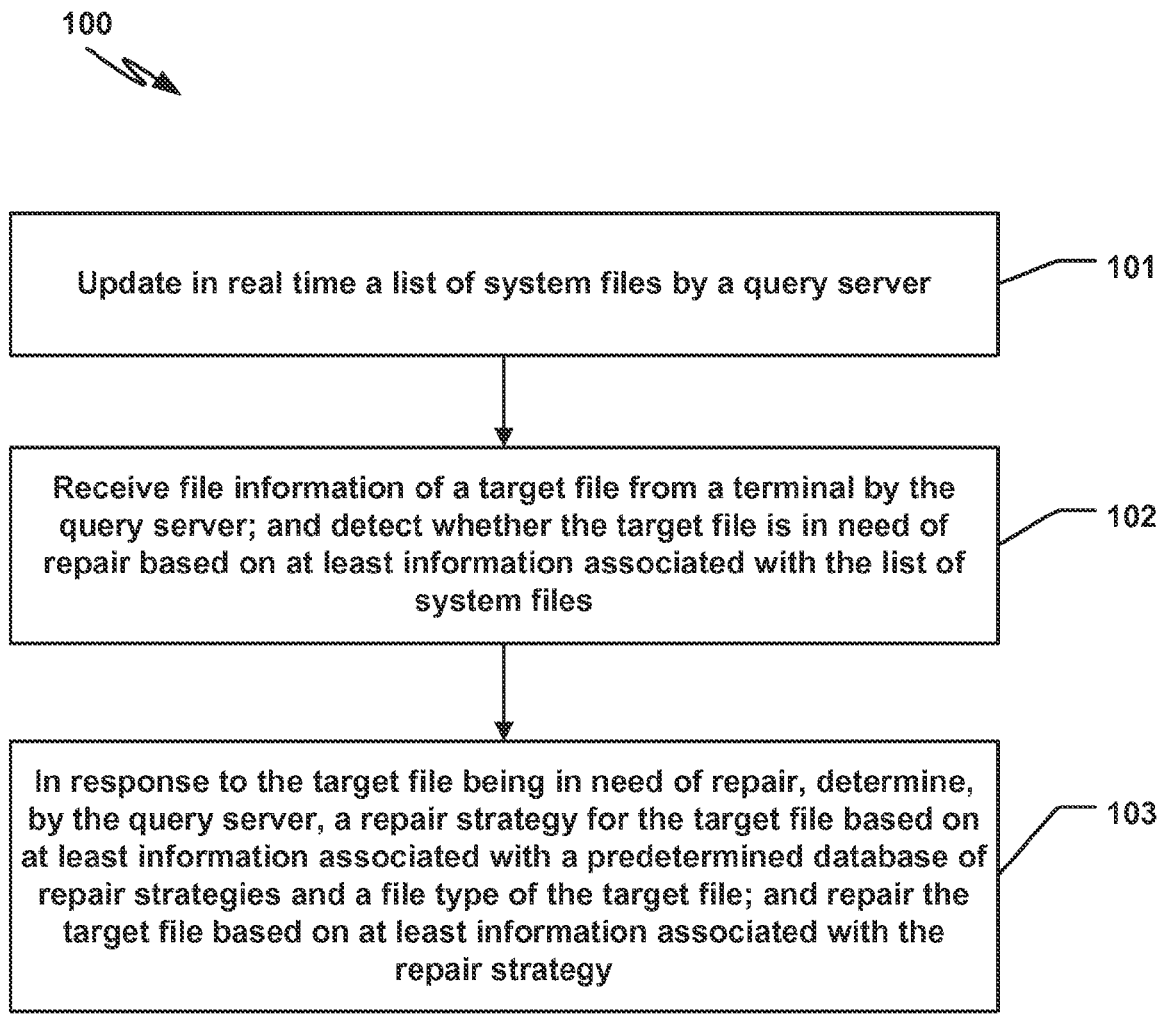
FIG. 1 is a simplified diagram showing a method for repairing system files according to one embodiment of the present invention.

FIG. 1 is a simplified diagram showing a method for repairing system files according to one embodiment of the present invention. This diagram is merely an example, which should not unduly limit the scope of the claims. One of ordinary skill in the art would recognize many variations, alternatives, and modifications. The method 100 includes at least the process 101 for updating in real time a list of system files, the process 102 for receiving file information of a target file sent from a terminal and detecting whether the target file is in need of repair, and the process 103 for, in response to the target file being in need of repair, determining a first repair strategy for the target file and repairing the target file based on at least information associated with the first repair strategy.

According to one embodiment, at the process 101, a query server updates a list of system files in real time, where the list of system files records file information of one or more repairable system files. For example, the query server can regularly acquire the most up-to-date list of system files from a background management process or application. The list of system files may be managed and maintained by certain operation-and-maintenance personnel using the background management process or application. For example, if a manufacturer of the operating system releases a new Knowledge-Base (KB) list, or new computer viruses or Trojan programs that affect the system files are discovered, the operation-and-maintenance personnel may update the list of system files accordingly.

According to another embodiment, at the process 102, the query server receives file information of a target file sent by a terminal and determines if the target file is in need of repair according to the list of system files. For example, if the target file is altered without authorization or the target file includes a computer virus or a Trojan program, the query server determines that the target file is in need of repair.

According to yet another embodiment, at the process 103, if it is detected that the target file needs repair, the query server determines a repair strategy for the target file according to a predetermined database of repair strategies and the file type of the target file, and repairs the target file according to the determined repair strategy.

Figure 2:
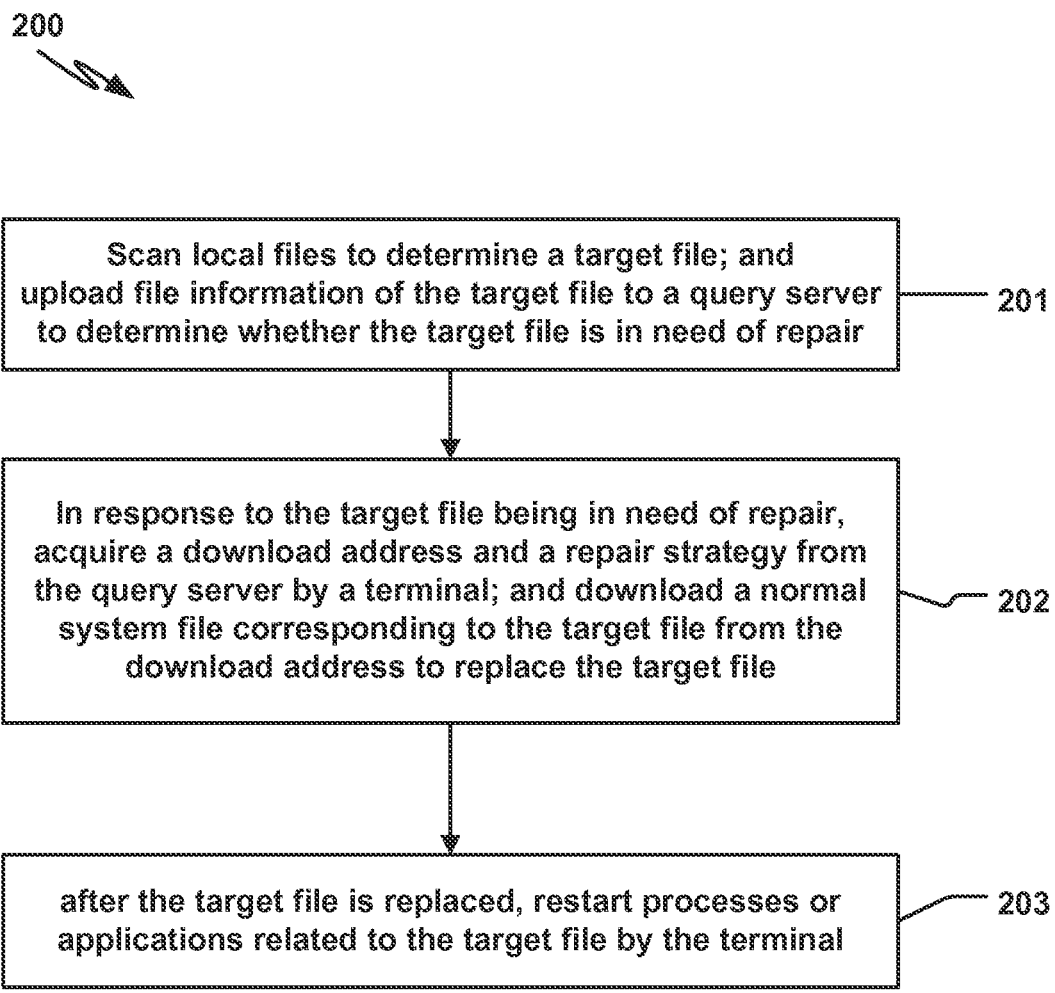
FIG. 2 is a simplified diagram showing a method for repairing system files according to another embodiment of the present invention.

FIG. 2 is a simplified diagram showing a method for repairing system files according to another embodiment of the present invention. This diagram is merely an example, which should not unduly limit the scope of the claims. One of ordinary skill in the art would recognize many variations, alternatives, and modifications. The method 200 includes at least the process 201 for scanning local files to determine a target file and uploading file information of the target file to determine if the target file is in need of repair, the process 202 for, in response to the target file being in need of repair, acquiring a download address and a repair strategy from the query server and downloading a normal system file corresponding to the target file from the download address to replace the target file, and the process 203 for, after the target file is replaced, restarting processes or applications related to the target file.

According to one embodiment, the process 201 includes scanning one or more local files to determine a target file and uploading file information of the target file to a query server to determine whether the target file is in need of repair. For example, the one or more local files are stored on a terminal which may include one or more computers, one or more smart phones or one or more tablets.

According to another embodiment, at the process 202, if the target file needs repair, the terminal acquires a download address and a repair strategy from the query server and downloads a normal system file corresponding to the target file from, the download address to replace the target file.

According to yet another embodiment, at the process 203, after the target file is replaced, the terminal restarts one or more processes or one or more applications related to the target file based on at least information associated with the repair strategy. For example, the restarting of the processes or the applications related to the target file completes the system repair and makes the system operate normally, so that it is not necessary to reboot the terminal.

Figure 3:
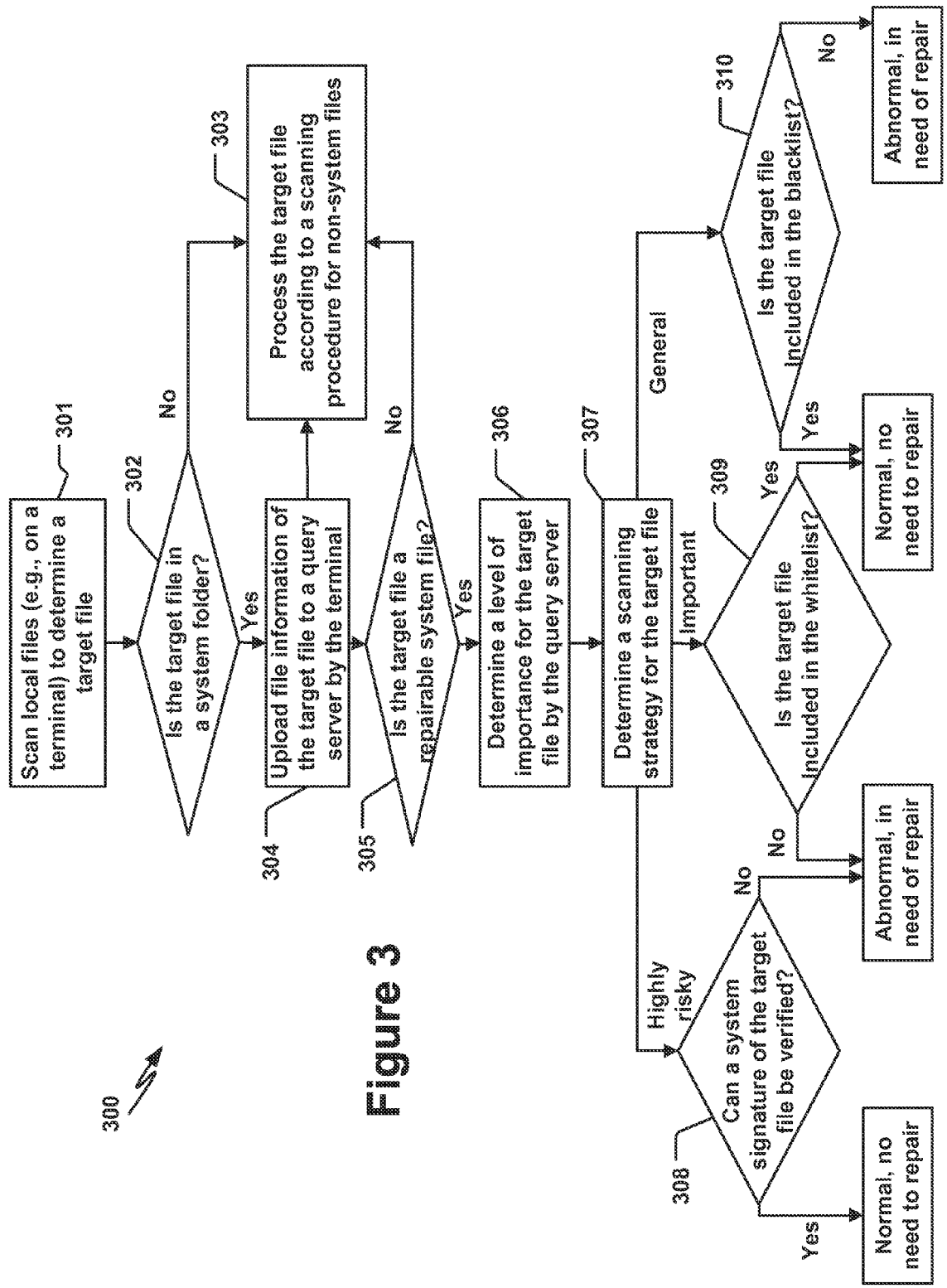
FIG. 3 is a simplified diagram showing a method for detecting whether a target file needs repair according to one embodiment of the present invention.

FIG. 3 is a simplified diagram showing a method for detecting whether a target file needs repair according to one embodiment of the present invention. This diagram is merely an example, which should not unduly limit the scope of the claims. One of ordinary skill in the art would recognize many variations, alternatives, and modifications. The method 300 includes at least the process 301 for scanning local files to determine a target file, the process 302 for detecting whether the target file is in one of system folders, the process 304 for uploading file information of the target file to a query server, and the process 303 for processing the target file according to a scanning procedure for non-system files. Further, the method 300 includes the process 305 for detecting whether the target file is a repairable system file, the process 306 for determining a level of importance for the target file, and the process 307 for determining a scanning strategy for the target file based on a predetermined database of scanning strategies and the level of importance for the target file. In addition, the method 300 includes the process 308 for verifying a system signature of the target file, the process 309 for detecting whether the target file is in need of repair based on at least information associated with a whitelist, and the process 310 for detecting whether the target file is in need of repair based on at least information associated with a blacklist.

According to one embodiment, at the process 301, a terminal scans one or more local files to acquire a target file. Specifically, the terminal determines a scanning method according to a user's instructions. For example, the terminal scans only files in one or more system folders, all files currently in the terminal, or one or more files designated by the user.

According to another embodiment, at the process 302, the terminal detects if the target file is in one of the system folders. For example, if the target file is not in any system folders, the process 303 is executed, and if the target file is in a system folder, the process 304 is executed.

According to yet another embodiment, at the process 303, the target file is processed according to a scanning procedure for non-system files. Any available techniques for processing non-system files may be used to process the target file. As an example, the system files are stored in the system folders to ensure normal operations of the operating system. In another example, files in non-system folders are generally not system files and/or do not affect the system operations.

In one embodiment, at the process 304, the terminal uploads the file information of the target file to the query server. For example, the query server can update the list of system files in real time, wherein the list of system files records the file information of repairable system files. In certain embodiments, the file information of the target file includes a version number of the operating system and a patch number of the operating system, a system-file name of the target file and a system-file version number of the target file. For example, the file information of the target file is used by the query server to determine a download address of a normal system file corresponding to the target file.

In another embodiment, at the process 305, the query server receives the file information of the target file sent by the terminal and detects if the target file is a repairable system file according to the list of system files. For example, if the target file is not a repairable file, the process 303 is executed, and if the target file is a repairable file, the process 306 is executed.

In yet another embodiment, at the process 306, the query server determines a level of importance of the target file according to the file information of the target file. For example, the level of importance of the target file is chosen from at least three levels: "highly risky," "important" and "general." As an example, the system files of different levels of importance correspond to different scanning strategies.

Specifically, the query server can predetermine a database of scanning strategies which includes scanning strategies corresponding to system files of different levels of importance, according to certain embodiments. When the database of scanning strategies is being predetermined, the levels of importance of certain system files can be determined according to the importance of the system files and the frequencies of the system files being utilized by one or more viruses, in some embodiments. For example, the list of system files stored in the query server includes the predetermined database of scanning strategies, a blacklist and a whitelist, where the blacklist records the file information of abnormal files and the whitelist records the file information of normal system files.

In yet another embodiment, at the process 307, the query server determines the scanning strategy corresponding to the target file according to the database of scanning strategies and the level of importance of the target file. Specifically, as an example, if the target file is a "highly risky" file, the process 308 is executed; if the target file is an "important" file, the process 309 is executed; or if the target file is a "general" file, the process 310 is executed.

After the determination of the scanning strategy for the target file, the query server scans the target file according to the determined scanning strategy and detects if the target file needs repair, in some embodiment. For example, at the process 308, the query server verifies the system signature of the target file. As an example, if the system signature of the target file passes verification, the target file is determined to be a normal system file which does not need repair. In another example, if the system signature of the target file fails to pass verification, the target file is determined to be an abnormal system file which needs repair.

According to one embodiment, at the process 309, the query server detects if the target file needs repair according to the whitelist, i.e., a "black-if-not-white" standard. For example, the query server determines that the target file is abnormal and needs repair if the target file is not included in the whitelist. In another example, if the target file is included in the whitelist, the query server determines that the target file is normal and does not need repair.

According to another embodiment, at the process 310, the query server detects if the target file needs repair according to the blacklist, i.e. a "white-if-not-black" standard. For example, if the blacklist includes the target file, the query server determines that the target file is abnormal and needs repair. In another example, if the target file is not included in the blacklist, the query server determines that the target file is normal and does not need repair.

Figure 4:
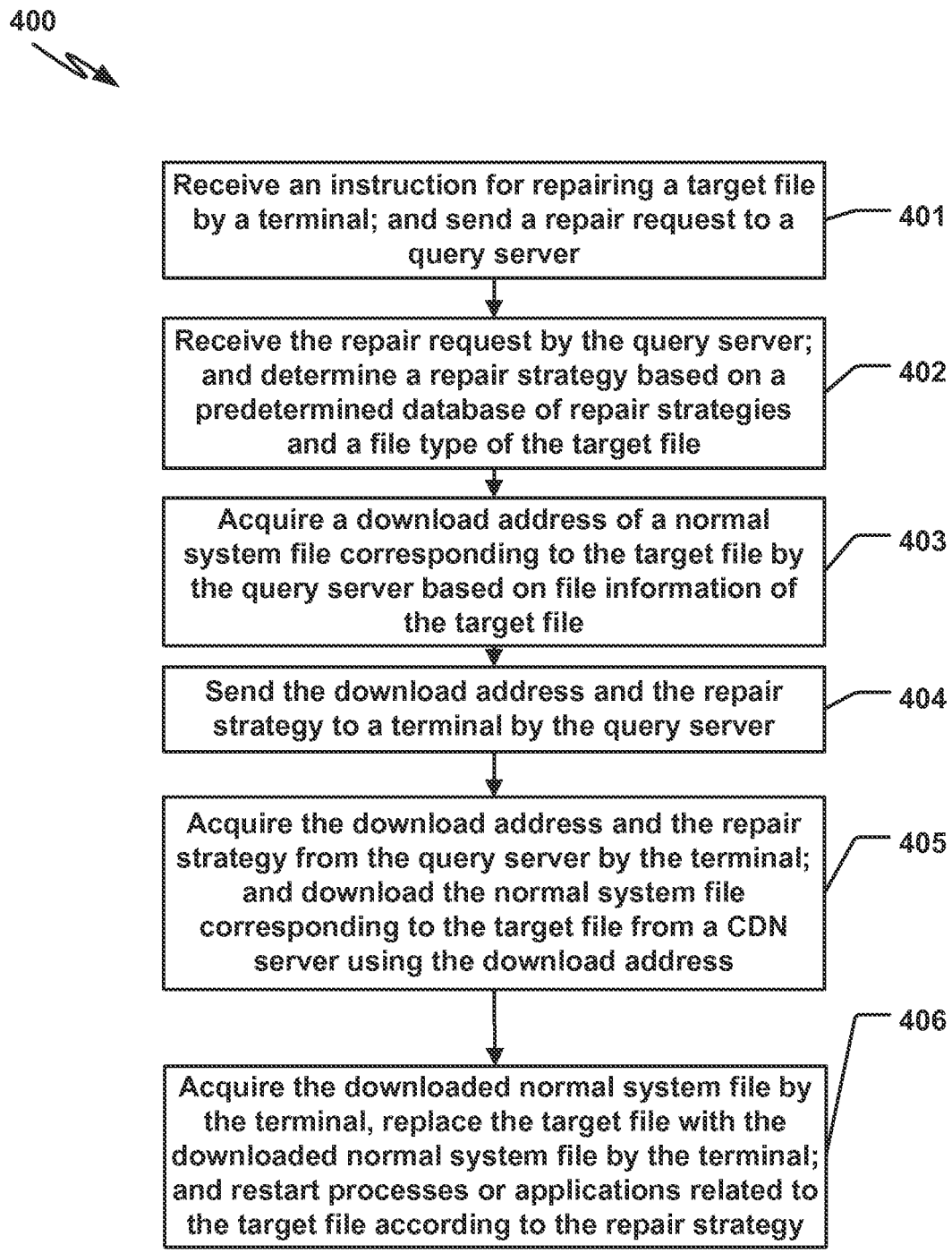
FIG. 4 is a simplified diagram showing a method for repairing system files according to another embodiment of the present invention.

If the target file is determined to be in need of repair, e.g., through the processes 301-310, the target file may be repaired according to processes shown in FIG. 4.

FIG. 4 is a simplified diagram showing a method for repairing system files according to another embodiment of the present invention. This diagram is merely an example, which should not unduly limit the scope of the claims. One of ordinary skill in the art would recognize many variations, alternatives, and modifications. The method 400 includes at least the process 401 for receiving an instruction for repairing a target file by a terminal and sending a repair request to a query server, the process 402 for receiving the repair request by the query server and determining a repair strategy based on a predetermined database of repair strategies and a file type of the target file, and the process 403 for acquiring a download address of a normal system file corresponding to the target file by the query server based on file information of the target file. The method 400 further includes the process 404 for sending the download address and the repair strategy, the process 405 for acquiring the download address and the repair strategy and downloading the normal system file corresponding to the target file, and the process 406 for replacing the target file with the downloaded normal system file and restarting processes or applications related to the target file according to the repair strategy.

According to one embodiment, at the process 401, after receiving a repair instruction for the target file, the terminal sends a repair request to the query server. For example, at the process 402, the query server receives the repair request and determines the repair strategy for the target file according to a predetermined database of repair strategies and a file type of the target file. In another example, the query server predetermines a database of repair strategies which is used to determine a repair strategy according to a file type of the target file, and the repair strategy is used to determine one or more processes or one or more applications related to the target file according to the file type of the target file so as to restart the related processes or applications after the target file is replaced.

According to another embodiment, at the process 403, the query server determines a download address of a normal system file corresponding to the target file based on the file information of the target file, e.g., a version number of the operating system, a patch number of the operating system, a system-file name of the target file and a system-file version number of the target file. For example, at the process 404, the query server sends the determined repair strategy and the download address to the terminal to enable the terminal to download the normal system file from the download address to replace the target file. In another example, after the target file is replaced, the processes or the applications related to the target file are restarted according to the repair strategy.

According to yet another embodiment, at the process 405, the terminal acquires the download address and the repair strategy from the query server and downloads the normal system file corresponding to the target file from a CDN (content delivery network) server according to the download address. For example, the CDN server is used to provide the download service of the normal system file in the list of system files to the terminal. In certain embodiments, the CDN server is replaced with equipment capable of providing download service to the terminal.

According to yet another embodiment, at the process 406, the terminal acquires the normal system file corresponding to the target file, replaces the target file, and restarts the processes or the applications related to the target file according to the repair strategy.

In some embodiments, certain repair strategies may be implemented as follows:

(1) if the target file is related to an Explorer.exe process, the Explorer.exe process is restarted after the target file is replaced;
(2) if the target file is related to an input method, the input method-related process is restarted after the target file is replaced;
(3) If the target file is related to network connection, the entire network connection is repaired after the target file is replaced;
(4) If the target file is related to an IE browser, an IE process is restarted after the target file is replaced; and
(5) if the target file related to the operating system, the operating system is rebooted after the target file is replaced.

As discussed above and further emphasized here, FIG. 4 is merely an example, which should not unduly limit the scope of the claims. One of ordinary skill in the art would recognize many variations, alternatives, and modifications. For example, after the terminal restarts the processes or the applications related to the target file according to the repair strategy, the terminal makes further optimization according to the repair strategy. As an example, if the target file has records in the registry, the terminal restores one or more registry key values related to the target file after restarting the processes or applications related to the target file.

Figure 5:
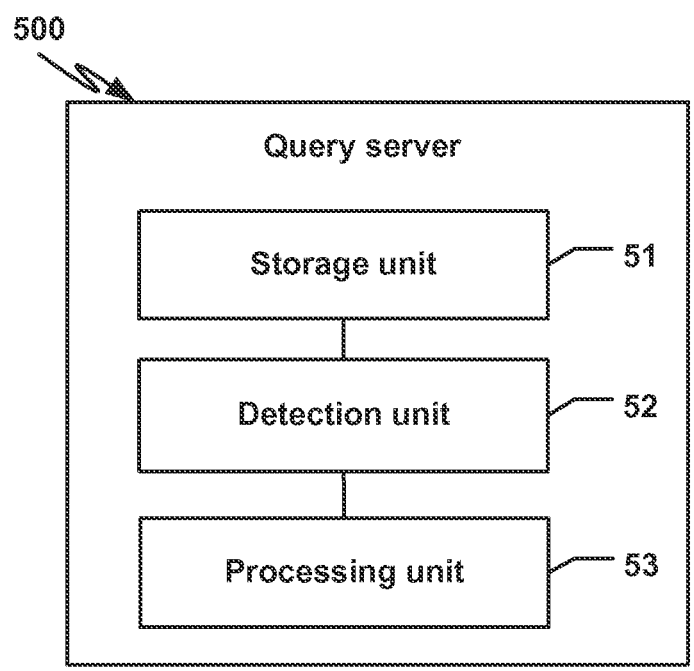
FIG. 5 is a simplified diagram of a query server for repairing system files according to one embodiment of the present invention.

FIG. 5 is a simplified diagram of a query server for repairing system files according to one embodiment of the present invention. This diagram is merely an example, which should not unduly limit the scope of the claims. One of ordinary skill in the art would recognize many variations, alternatives, and modifications. The query server 500 includes a storage unit 51, a detection unit 52 and a processing unit 53.

According to one embodiment, the storage unit 51 is configured to store a list of system files being updated in real time, the list of system files including file information of one or more first repairable system files. For example, the detection unit 52 is configured to receive file information of a target file sent from a terminal and detect whether the target file is in need of repair based on at least information associated with the list of system files. In another example, the processing unit 53 is configured to determine a repair strategy for the target file based on at least information associated with a predetermined database of repair strategies and a file type of the target file in response to the target file being in need of repair and repair the target file based on at least information associated with the repair strategy.

According to another embodiment, the list of system files updated in real time in the storage unit 51 includes a predetermined database of scanning strategies, a predetermined database of repair strategies, a blacklist and a whitelist. For example, the blacklist records file information of abnormal files, and the whitelist records file information of normal system files. In another example, the predetermined database of scanning strategies classifies the system files into three levels of importance: "highly risky," "important" and "general." In yet another example, the system files of different levels of importance correspond to different scanning strategies. As an example, if a target file is a highly risky file, a system signature of the target file is verified to determine if it needs repair. In another example, if the target file is an important file, it is determined according to the whitelist. That is, if the whitelist does not include the target file, the target file is determined to be abnormal and thus needs repair. In yet another example, if the target file is a general file, it is determined if the target file needs repair according to the blacklist. That is, if the blacklist includes the target file, the target file is determined as abnormal and needs repair.

According to yet another embodiment, the database of repair strategies is used to determine a repair strategy corresponding to the file type of the target file. For example, the repair strategy is used to determine one or more processes or one or more applications according to a file type of the target file. As an example, after the target file is replaced, the processes or the applications related to the target file are restarted.

Figure 6:
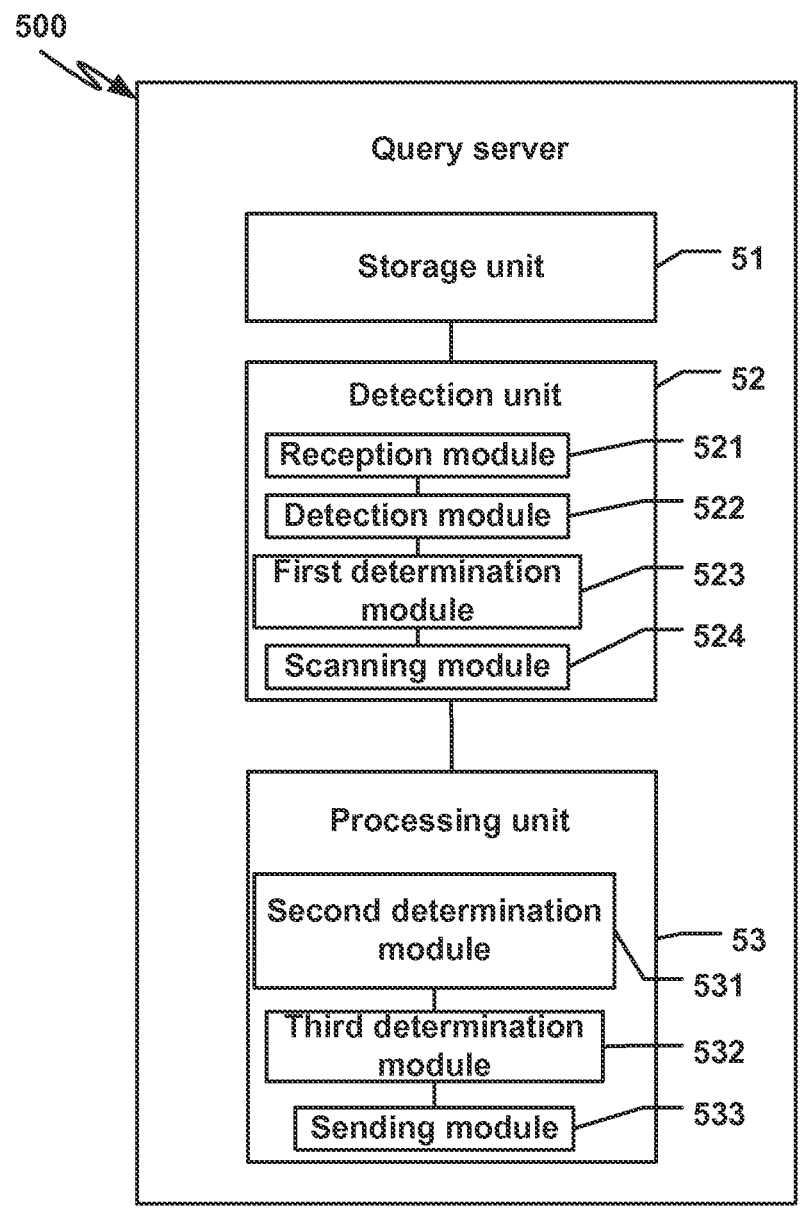
FIG. 6 is a simplified diagram showing certain components of the query server as shown in FIG. 5 for repairing system files according to one embodiment of the present invention.

FIG. 6 is a simplified diagram showing certain components of the query server 500 for repairing system files according to one embodiment of the present invention. This diagram is merely an example, which should not unduly limit the scope of the claims. One of ordinary skill in the art would recognize many variations, alternatives, and modifications. The detection unit 52 includes a reception module 521, a detection module 522, a first determination module 523 and a scanning module 524. The processing unit 53 includes a second determination module 531, a third determination module 532 and a sending module 533.

According to one embodiment, the reception module 521 is configured to receive the file information of the target file sent from the terminal. For example, the detection module 522 is configured to detect whether the target file is a repairable system file based on at least information associated with the list of system files. As an example, the first determination module 523 is configured to determine a scanning strategy corresponding to the target file based on at least information associated with the database of scanning strategies in response to the target file being a repairable system file. In one example, the scanning module 524 is configured to scan the target file based on at least information associated with the determined scanning strategy and determine whether the target file is in need of repair. Specifically, the file information of the target file received by the detection unit 52 includes a version number of the operating system, a patch number of the operating system, a system-file name of the target file, and a system-file version number of the target file.

According to another embodiment, the second determination module 531 is configured to determine the repair strategy for the target file based on at least information associated with the database of repair strategies and the file type of the target file. For example, the third determination module 532 is configured to determine a download address of a normal system file corresponding to the target file based on at least the file information of the target file. As an example, the sending module 533 is configured to send the repair strategy and the download address to the terminal to enable the terminal to download the normal system file from the download address to replace the target file and, in response to the target file being replaced, restart the processes or the applications related to the target file based on at least information associated with the repair strategy.

Figure 7:
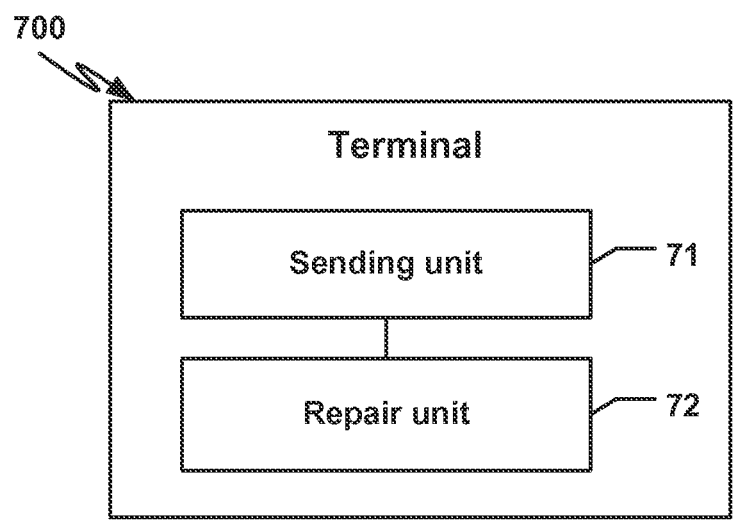
FIG. 7 is a simplified diagram showing a terminal for repairing system files according to one embodiment of the present invention.

FIG. 7 is a simplified diagram showing a terminal for repairing system files according to one embodiment of the present invention. This diagram is merely an example, which should not unduly limit the scope of the claims. One of ordinary skill in the art would recognize many variations, alternatives, and modifications. The terminal 700 includes a sending unit 71 and a repair unit 72.

According to one embodiment, a sending unit 71 is configured to scan one or more local files to determine a target file and upload file information of the target file to a query server to determine whether the target file is in need of repair. For example, the repair unit 72 is configured to, in response to the target file being in need of repair, acquire a download address and a repair strategy from the query server, download a normal system file corresponding to the target file from the download address to replace the target file, and restart, after the target file is replaced, one or more processes or one or more applications related to the target file based on at least information associated with the repair strategy. Specifically, the target file sent by the sending unit 71 is in a system folder, in some embodiments. The file information of the target file is used by the query server to determine the download address of the normal system file corresponding to the target file, and the file information of the target file includes a version number of the operating system, a patch number of the operating system, a system-file name of the target file, and a system-file version number of the target file, in certain embodiments.

According to another embodiment, the repair strategy acquired by the repair unit 72 is used to determine the processes or the applications related to the target file according to the file type of the target file so as to enable the terminal to restart the related processes or applications after the repair is finished.

According to another embodiment, a method is provided for repairing system files. For example, a list of system files including file information of one or more first repairable system files are updated in real time; file information of a target file sent from a terminal is received; whether the target file is in need of repair is detected based on at least information associated with the list of system files; in response to the target file being in need of repair, a first repair strategy for the target file is determined based on at least information associated with a predetermined database of repair strategies and a file type of the target file; and the target file is repaired based on at least information associated with the first repair strategy. For example, the method is implemented according to at least FIG. 1, FIG. 5, and/or FIG. 6.

According to another embodiment, a method is provided for repairing system files. For example, one or more local files are scanned to determine a target file; file information of the target file is uploaded to a query server to determine whether the target file is in need of repair; in response to the target file being in need of repair, a download address and a repair strategy are acquired from the query server; a normal system file corresponding to the target file is downloaded from the download address to replace the target file; and after the target file is replaced, one or more processes or one or more applications related to the target file are restarted based on at least information associated with the repair strategy. For example, the method is implemented according to at least FIG. 2, FIG. 3, FIG. 4, and/or FIG. 7.

According to yet another embodiment, a query server includes a storage unit, a detection unit, and a processing unit. The storage unit is configured to store a list of system files being updated in real time, the list of system files including file information of one or more first repairable system files. The detection unit is configured to receive file information of a target file sent from a terminal and detect whether the target file is in need of repair based on at least information associated with the list of system files. The processing unit is configured to determine a first repair strategy for the target file based on at least information associated with a predetermined database of repair strategies and a file type of the target file in response to the target file being in need of repair and repair the target file based on at least information associated with the first repair strategy. For example, the query server is implemented according to at least FIG. 5, and/or FIG. 6.

In one embodiment, a terminal includes a sending unit and a repair unit. The sending unit is configured to scan one or more local files to determine a target file and upload file information of the target file to a query server to determine whether the target file is in need of repair. The repair unit is configured to, in response to the target file being in need of repair, acquire a download address and a repair strategy from the query server, download a normal system file corresponding to the target file from the download address to replace the target file, and restart, after the target file is replaced, one or more processes or one or more applications related to the target file based on at least information associated with the repair strategy. For example, the terminal is implemented according to at least FIG. 7.

In another embodiment, a non-transitory computer readable storage medium includes programming instructions for repairing system files. The programming instructions are configured to cause one or more data processors to execute certain operations. For example, a list of system files including file information of one or more repairable system files are updated in real time; file information of a target file sent from a terminal is received; whether the target file is in need of repair is detected based on at least information associated with the list of system files; in response to the target file being in need of repair, a repair strategy for the target file is determined based on at least information associated with a predetermined database of repair strategies and a file type of the target file; and the target file is repaired based on at least information associated with the repair strategy. For example, the storage medium is implemented according to at least FIG. 1, FIG. 5, and/or FIG. 6.

In yet another embodiment, a computer-implemented system for repairing system files includes one or more data processors and a computer-readable storage medium. The computer-readable storage medium is encoded with instructions for commanding the data processors to execute certain operations. For example, a list of system files including file information of one or more repairable system files are updated in real time; file information of a target file sent from a terminal is received; whether the target file is in need of repair is detected based on at least information associated with the list of system files; in response to the target file being in need of repair, a repair strategy for the target file is determined based on at least information associated with a predetermined database of repair strategies and a file type of the target file; and the target file is repaired based on at least information associated with the repair strategy. For example, the system is implemented according to at least FIG. 1, FIG. 5, and/or FIG. 6.

According to one embodiment, a non-transitory computer readable storage medium includes programming instructions for repairing system files. The programming instructions are configured to cause one or more data processors to execute certain operations. For example, one or more local files are scanned to determine a target file; file information of the target file is uploaded to a query server to determine whether the target file is in need of repair; in response to the target file being in need of repair, a download address and a repair strategy are acquired from the query server; a normal system file corresponding to the target file is downloaded from the download address to replace the target file; and after the target file is replaced, one or more processes or one or more applications related to the target file are restarted based on at least information associated with the repair strategy. For example, the storage medium is implemented according to at least FIG. 2, FIG. 3, FIG. 4, and/or FIG. 7.

According to another embodiment, a computer-implemented system for repairing system files includes one or more data processors and a computer-readable storage medium. The computer-readable storage medium is encoded with instructions for commanding the data processors to execute certain operations. For example, one or more local files are scanned to determine a target file; file information of the target file is uploaded to a query server to determine whether the target file is in need of repair; in response to the target file being in need of repair, a download address and a repair strategy are acquired from the query server; a normal system file corresponding to the target file is downloaded from the download address to replace the target file; and after the target file is replaced, one or more processes or one or more applications related to the target file are restarted based on at least information associated with the repair strategy. For example, the system is implemented according to at least FIG. 2, FIG. 3, FIG. 4, and/or FIG. 7.

The above only describes several scenarios presented by this invention, and the description is relatively specific and detailed, yet it cannot therefore be understood as limiting the scope of this invention's patent. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope or of what may be claimed, but rather as descriptions of features specific to particular embodiments. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, hut only by the scope of the appended claims.

What is claimed is:

1. A method for repairing system files, the method comprising:
    updating in real time a list of system files including file information of one or more first repairable system files;
    receiving file information of a target file sent from a terminal;
    detecting whether the target file is in need of repair based on at least information associated with the list of system files;
    in response to the target file being in need of repair,
        determining a first repair strategy for the target file based on at least information associated with a predetermined database of repair strategies and a file type of the target file; and
        repairing the target file based on at least information associated with the first repair strategy;
    wherein:
        the list of system files includes a predetermined database of scanning strategies and the database of repair strategies;
        the predetermined database of scanning strategies classifies one or more second system files into three levels of importance: highly risky, important and general, the second system files of different levels of importance corresponding to different scanning strategies;
        the database of repair strategies is used to determine a second repair strategy corresponding to a file type of a third system file, the second repair strategy being used to determine one or more first processes or one or more first applications related to the third system file based on at least information associated with the file type of the third system file; and
        in response to the target file being repaired, one or more second processes or one or more second applications related to the target file are restarted.

2. The method of claim 1, wherein the detecting whether the target file is in need of repair based on at least information associated with the list of system files includes:
    detecting whether the target file is a repairable system file based on at least information associated with the list of system files;
    in response to the target file being a repairable system file, determining a scanning strategy corresponding to the target file based on at least information associated with the database of scanning strategies;
    scanning the target file based on at least information associated with the determined scanning strategy; and
    detecting whether the target file is in need of repair.

3. The method of claim 2, wherein the repairing the target file based on at least information associated with the first repair strategy includes:

determining a download address of a normal system file corresponding to the target file based on at least the file information of the target file;

sending the first repair strategy and the download address to the terminal to enable the terminal to download the normal system file from the download address to replace the target file; and in response to the target file being replaced, restarting the second processes or the second applications related to the target file based on at least information associated with the first repair strategies.

4. The method of claim 1, wherein the levels of importance of the second system files are determined based on at least information associated with importance of the second system files and frequencies of the second system files being utilized by one or more viruses when the database of scanning strategies is being pre-determined.

5. A computer-implemented system for repairing system files, said system comprising:
one or more data processors configured to:
update in real time a list of system files including file information of one or more first repairable system files;
receive file information of a target file sent from a terminal;
detect whether the target file is in need of repair based on at least information associated with the list of system files;
in response to the target file being in need of repair,
determine a first repair strategy for the target file based on at least information associated with a predetermined database of repair strategies and a file type of the target file; and
repair the target file based on at least information associated with the first repair strategy; and
one or more non-transitory computer-readable storage media configured to store the list of system files;
wherein:
the list of system files includes a predetermined database of scanning strategies and the database of repair strategies;
the predetermined database of scanning strategies classifies one or more second system files into three levels of importance: highly risky, important and general, the second system files of different levels of importance corresponding to different scanning strategies;
wherein the one or more data processors are further configured to:
use the database of repair strategies to determine a second repair strategy corresponding to a file type of a third system file;
use the second repair strategy to determine one or more first processes or one or more first applications related to the third system file based on at least information associated with the file type of the third system file; and
in response to the target file being repaired, restart one or more second processes or one or more second applications related to the target file.

6. The system of claim 5, wherein the one or more data processors are further configured to:
detect whether the target file is a repairable system file based on at least information associated with the list of system files;

in response to the target file being a repairable system file, determine a scanning strategy corresponding to the target file based on at least information associated with the database of scanning strategies;
scan the target file based on at least information associated with the determined scanning strategy; and
detect whether the target file is in need of repair.

7. The system of claim 6, wherein the one or more data processors are further configured to:
determine a download address of a normal system file corresponding to the target file based on at least the file information of the target file;
send the first repair strategy and the download address to the terminal to enable the terminal to download the normal system file from the download address to replace the target file; and
in response to the target file being replaced, restart the second processes or the second applications related to the target file based on at least information associated with the first repair strategies.

8. The system of claim 5, wherein the one or more data processors are further configured to determine the levels of importance of the second system files based on at least information associated with importance of the second system files and frequencies of the second system files being utilized by one or more viruses when the database of scanning strategies is being pre-determined.

9. A non-transitory computer readable medium comprising programming instructions for repairing system files, the programming instructions configured to cause a processing system to execute operations comprising:
updating in real time a list of system files including file information of one or more first repairable system files;
receiving file information of a target file sent from a terminal;
detecting whether the target file is in need of repair based on at least information associated with the list of system files;
in response to the target file being in need of repair,
determining a first repair strategy for the target file based on at least information associated with a predetermined database of repair strategies and a file type of the target file; and
repairing the target file based on at least information associated with the first repair strategy;
wherein:
the list of system files includes a predetermined database of scanning strategies and the database of repair strategies;
the predetermined database of scanning strategies classifies one or more second system files into three levels of importance: highly risky, important and general, the second system files of different levels of importance corresponding to different scanning strategies;
the database of repair strategies is used to determine a second repair strategy corresponding to a file type of a third system file, the second repair strategy being used to determine one or more first processes or one or more first applications related to the third system file based on at least information associated with the file type of the third system file; and
in response to the target file being repaired, one or more second processes or one or more second applications related to the target file are restarted.

* * * * *